Feb. 11, 1941.    M. LACHMAN    2,231,450
METHOD OF FORMING A GRIDLIKE STRUCTURE
Filed Sept. 15, 1936    2 Sheets-Sheet 1

INVENTOR
Maurice Lachman
BY Townsend & Decker
ATTORNEYS

Feb. 11, 1941. M. LACHMAN 2,231,450
METHOD OF FORMING A GRIDLIKE STRUCTURE
Filed Sept. 15, 1936 2 Sheets-Sheet 2
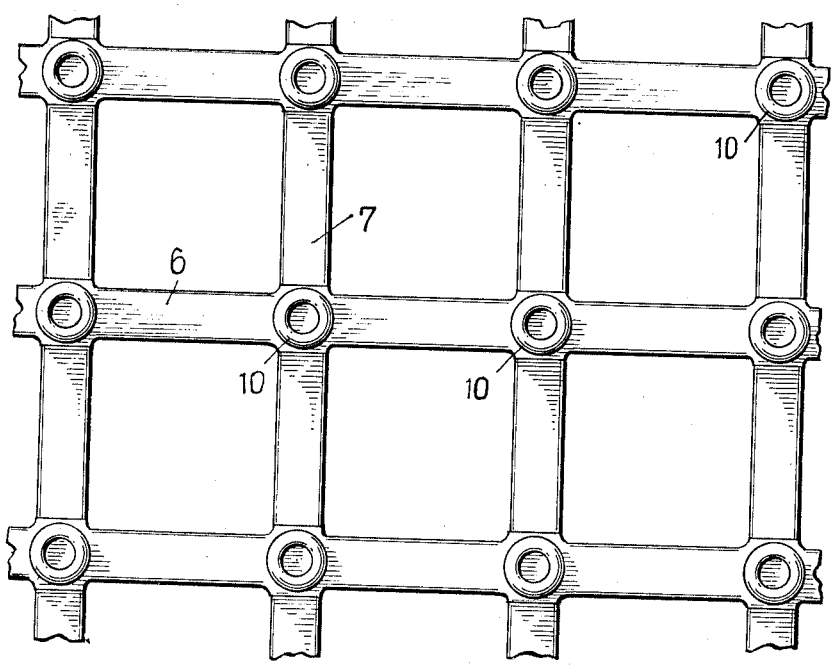
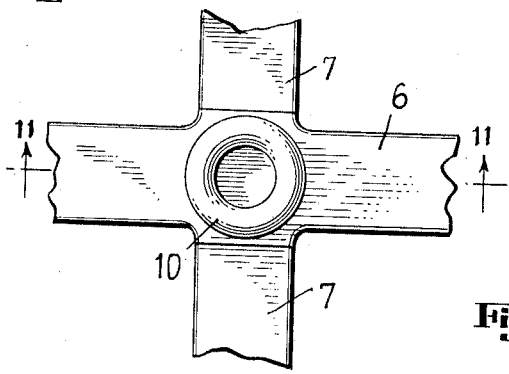
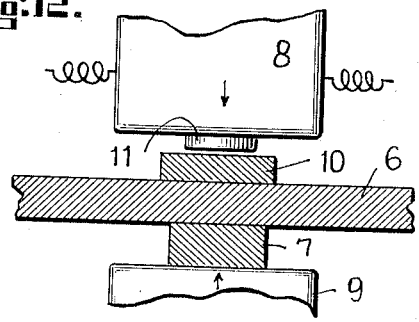
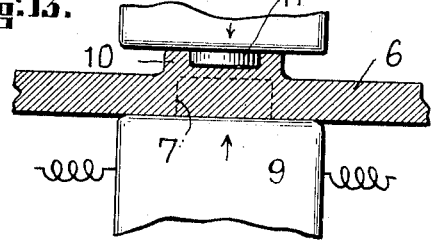
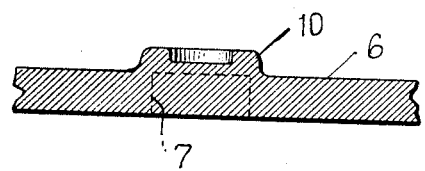
INVENTOR
Maurice Lachman
BY Townsend + Decker
ATTORNEYS Patented Feb. 11, 1941

2,231,450

UNITED STATES PATENT OFFICE 2,231,450

METHOD OF FORMING A GRIDLIKE STRUCTURE

Maurice Lachman, New York, N. Y., assignor to L. T. Corporation, Jersey City, N. J., a corporation of New Jersey Application September 15, 1936, Serial No. 100,837

2 Claims. (Cl. 219—10)

This invention relates to grills or gratings applicable for use as refrigerator shelvings or trays and comprising a plurality of spaced metallic longitudinal members united to a plurality of spaced metallic transverse or crossing members, preferably by the well-known electrical resistance method wherein pressure is applied to the crossing or intersecting members by suitable dies that also furnish the means of applying heating current to the work. The intersecting members at their points of intersection are thus united in a homogeneous or autogenous electric weld to produce a composite, integral structure. It will be understood from the subjoined description that the invention in its application is not to be limited in its use to refrigerator trays, but its application may be readily extended to other fields such, for instance, as gratings for sidewalks, etc.

The principal object of the invention is the production of a grill or grating or analogous grid-like structure of the general character heretofore described which shall possess extreme rigidity and strength while at the same time being of ease and simplicity of manufacture at relatively small expense.

A further object of the invention is the production of a grill or grating of the character described having an externally smooth uniform surface on both faces thereof, that is, a grill or grating in which both faces thereof are substantial duplicates or counterparts in configuration and appearance to permit the device to be readily reversed should occasion arise while still retaining its desirable mechanical, structural and ornamental features.

Still a further object of the invention is the production of a grill or grating comprising intersecting or crossing metallic members electrically welded together to form a composite and integral open structure in which the electric welds uniting the members together occupy a common plane with the plane of the united members on both faces of the structure, that is, the electric welds occupy a common plane with the plane of the crossing members themselves whereby the grill or grating will be substantially smooth on both faces.

A further object of the invention is the production of a grill or grating or analogous structure of the character described in which the crossing or intersecting members are united together in such manner as to produce a finished product in which no burr has been thrown out during the electric welding process in uniting such members together thereby obviating any unsightly deformation of the united members and also producing a structure in which no waste of metal occurs during the welding operation.

To the above ends, the invention consists in the novel process of making a gridlike structure as hereinafter more particularly described and then specified in the claims.

In the accompanying drawings illustrating a practical embodiment of the gridlike structure produced according to the method of the invention:

Fig. 8 is a plan view of a section of a grill or grating showing a modification of the invention in which the crossing members comprise rectangularly-shaped bars instead of rounded wires or rods as in the preferred form of the invention.

Fig. 9 is an end view of Fig. 8.

Fig. 10 is a plan view of a fragmentary portion of the completed structure showing two only of the intersecting or crossing members.

Fig. 11 is a horizontal section on the line 11—11 of Fig. 10.

Fig. 12 shows two of the crossing members in section and assembled for union by the electrical resistance welding process, and, Fig. 13 is a similar view but showing said crossing members after the welding operation has been effected.

Referring in detail to the several figures of the drawings:

The transverse members of the grill or grating are indicated at 1 and comprise metallic rods or wires which are preferably spaced apart equidistantly as illustrated. The metallic longitudinal members, which are indicated at 2, are preferably of the same size or diameter as said transverse members 1 and are also equidistantly spaced apart, as shown, and are united to said transverse members in the manner about to be described whereby an openwork, integral structure is produced which is peculiarly adapted in its application for use as screens, shelving and grills, etc. for refrigerators.

Figure 1:
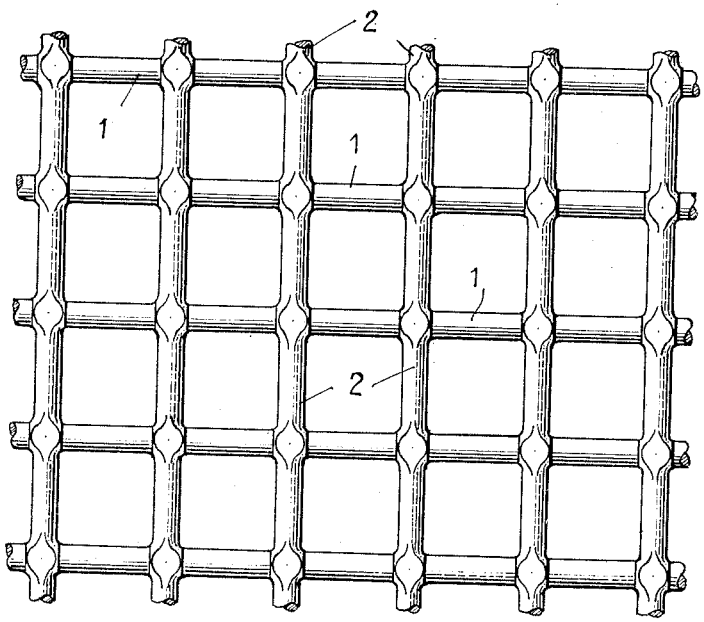
Fig. 1 is a plan view of a portion of the grill or grating or other gridlike structure embodying the invention.
Figure 2:
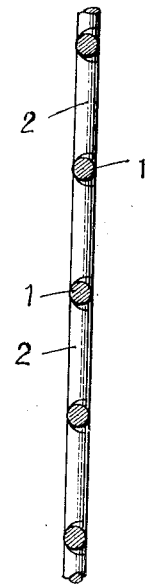
Fig. 2 is an end view of Fig. 1.
Figure 3:
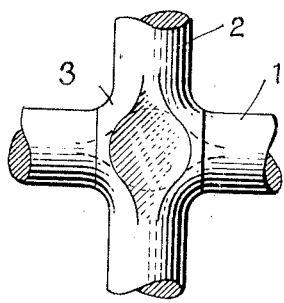
Fig. 3 is an enlarged plan view of two of the intersecting members.
Figure 4:
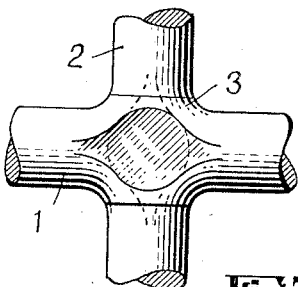
Fig. 4 is a bottom view of Fig. 3.
Figure 6:
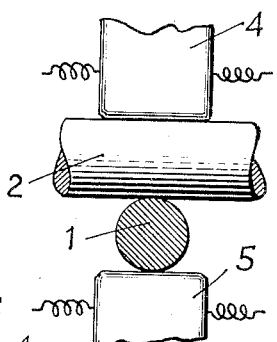
Fig. 6 is a side elevation (partly in section) of a fragmentary portion of two of the crossing members assembled for union at their points of intersection by the electrical resistance welding process.
Figure 5:
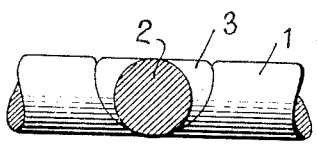
Fig. 5 is an end view of Fig. 3.

In constructing the grill or grating heretofore described the longitudinal metallic members 2 are assembled in spaced relation to each other and the transverse metallic members are then placed thereon in spaced relation (see Fig. 6) or vice versa and preferably at right-angles with respect thereto, or the members may be directed diagonally of each other or may extend in other directions and still be within the scope of the invention. At their places of intersection or crossing one set of the members is united to the other as at 3, to form autogenous or homogeneous electrically welded joints so that the joint itself shall be flush with the common plane in which both crossing members are situated.

Figure 7:
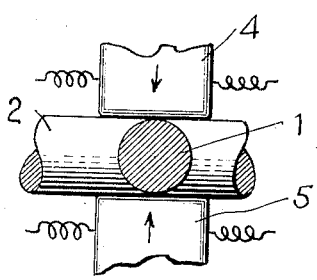
Fig. 7 shows the position of said crossing members after the welding or union has been effected by the aforesaid process.

To effect the autogenous or integral union of the members at the crossing thereof or at the place of their intersection, I employ the electrical resistance and pressure method and apply heating current and pressure at the point of their crossing by means of the welding electrodes or dies 4 and 5 and until the members 1 and 2 are brought into a common plane with one another and with the general plane occupied by them in the finished structure as indicated in Figs. 1, 2, 3, 4, 5, and 7. The pressure of the dies is continued until their movement toward each other is further prevented by the unheated and unsoftened portion of the members as shown in Fig. 7.

In the welding operation described it is extremely important that welding current of sufficient strength for fusing the members at their places of crossing be not maintained longer than a predetermined period of time to prevent the fusing or melting of the intersecting members to a degree of plasticity which might result in bisecting one or both of the members. Accordingly, in the process, a quick and heavy heating current is first applied to the members at the place of their crossing, the intensity or volume of which is decreased after a predetermined interval of time and the process is then continued with a slow heating to preserve the plastic condition of the intersecting parts, swaging pressure being applied by the electrodes or dies to flatten and press out the material in the direction of the longitudinal axis of each intersecting member. A homogeneous and autogenous welded joint of maximum strength is thus produced and one in which no burr appears or is thrown out and in which no waste metal obtains or is present.

As is obvious, the pressure of the dies at the time of the completing of the welding operation, will result in a slight flattening out of the intersecting members at their points of intersection and in the direction of their longitudinal axes but the softened or welded portion of the metal in said members will merge in the undeformed portion thereof and will lie within the general plane of the crossed members on both sides or faces of the structure whereby neither surface of the finished structure will offer an obstruction to the movement of objects across its face. This feature, of course, is advantageous when the structure is employed as a tray or shelving for refrigerators. When it is to be so used, obviously, a frame of any material may be fastened or connected to the free ends of the members 1 and 2 in any desirable manner.

In the modification illustrated in Figs. 3 through 13 inclusive I prefer to employ flat rectangular bars or plates instead of the rounded rods or wires as in the preferred form of the invention. In said modification 6 indicates the transverse members and 7 the longitudinal members of the structure which are united together by homogeneous and autogenous joints in the same manner as heretofore described in the preferred form of the invention. In this case the upper and lower welding and pressure dies or electrodes are indicated by the reference numerals 8 and 9 respectively.

I find it desirable in some cases to provide the grill or grating at the places of intersection between the transverse and longitudinal members with an ornamental button, indicated at 10, having a depressed portion centrally thereof as illustrated. When the structure is used as a shelf or tray for refrigerators, the button 10 is provided for the purpose of ornamentation only and to enhance the appearance of the structure, whereas if it is used, for instance, as a grating for sidewalks or for analogous uses the button may conveniently provide a non-skid tread. When employing the button a specially prepared upper electrode or die 8 is used and is provided with a depending annular portion 11. A supplemental rounded or annular metallic member 10 is also employed and is interposed intermediate the portion 11 of the upper welding die 8 and the transverse member 6 at the point of its intersection with the longitudinal member 7. When the dies 8 and 9 are brought into welding position and pressure is applied thereagainst the member 10 thereupon becomes welded to the structure and becomes a composite and integral part thereof, the depression centrally of the member 10 being formed by the annular portion 11 on the upper welding die 8 as will be manifest.

Various modifications may be resorted to without departing from the spirit of the invention as set forth in the appended claims.

The invention claimed is:

1. The method of forming a grid structure by uniting metallic members together consisting in bringing into surface contact two crossing members of substantially uniform cross section and of a cross section at their crossing points substantially equal to the original cross section, both of said members being of the same cross section, applying pressure and a heavy heating electric current at the point of intersection of said members for a predetermined period of time to fuse, coalesce and compact the metal of said members and to reduce their combined cross-section under the applied pressure to an extent approximately equal to the original cross section of one of the members at the crossing point, and then reducing the strength of the current to continue the process with slow heating and continued pressure to further coalesce and compact the metal to produce a structure wherein the portions of metal of the members at the point of intersection are homogeneously and integrally combined whereby the outer surfaces of the members occupy the same common plane on each face of said structure.

2. The method of forming a metallic structure comprising two sets of metallic members circular in cross section and of substantially equal cross-sectional area consisting in bringing unreduced portions of the members in crossed relation and into surface contact, subjecting said members at their points of contact to welding heat to fuse the metal thereof at said points and simultaneously subjecting the members to pressure to permit the molten metal to spread laterally at the joints and longitudinally of the members to form flattened areas and then reducing the strength of the current to continue the process with slow heating and continued pressure to homogeneously and integrally combine the metal of the members and produce a structure in which like surfaces of said flattened areas are substantially flush with each other on each face of said structure and one in which like surfaces of the members lie on each side of the completed structure within two planes spaced apart a distance substantially equal to the thickness of one of the members.

MAURICE LACHMAN.